United States Patent [19]
Sabel

[11] Patent Number: 5,211,412
[45] Date of Patent: May 18, 1993

[54] STEERING LINKAGE GREASE CUP RETAINER APPARATUS

[76] Inventor: James M. Sabel, 2600 Helm Rd., Carpentersville, Ill. 60110

[21] Appl. No.: 826,034

[22] Filed: Jan. 27, 1992

[51] Int. Cl.⁵ .............................................. F16C 11/06
[52] U.S. Cl. .................................. 280/95.1; 280/674; 277/212 R; 403/143; 403/36; 403/122
[58] Field of Search .......... 277/212 R, 212 C, 212 F, 277/9, 101; 403/143, 36, 141, 149, 122; 280/674, 95.1, 846

[56] References Cited

U.S. PATENT DOCUMENTS

| | | | |
|---|---|---|---|
| 175,115 | 3/1876 | Lee | 403/143 |
| 2,928,687 | 3/1960 | Latzen | 403/36 |
| 4,159,832 | 7/1979 | Inbody | 280/674 |

Primary Examiner—Karin L. Tyson
Attorney, Agent, or Firm—Leon Gilden

[57] ABSTRACT

A structure is set forth to provide replacement of a grease cup relative to a steering linkage and an associated joint thereof. Should a steering link and its associated joint loose the cup fitting, use of a grease cup and mounting of the joint therewithin is lost to effect rapid erosion of the joint, wherein the structure provides for an angulated plate member containing a replacement cup secured to the steering link at the joint to retain the joint and replacement cup to the steering link.

4 Claims, 4 Drawing Sheets

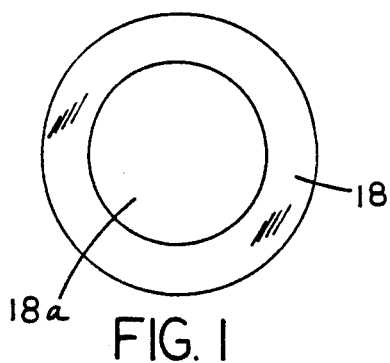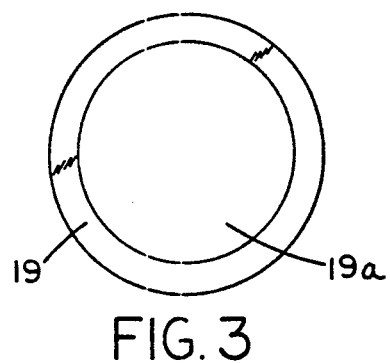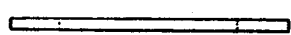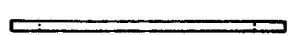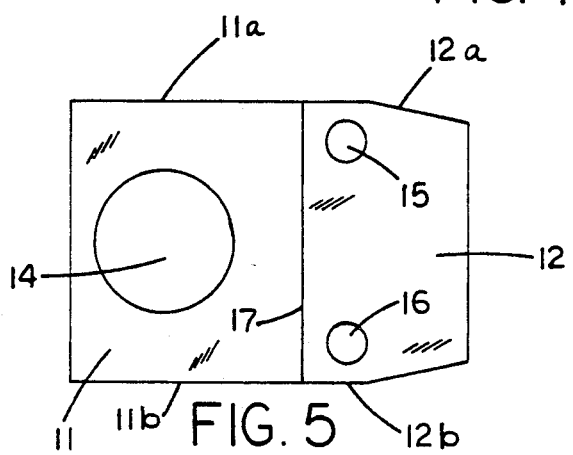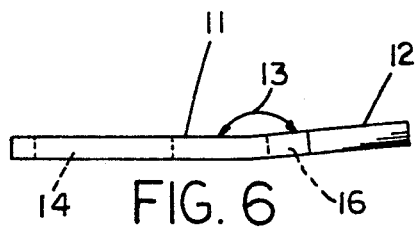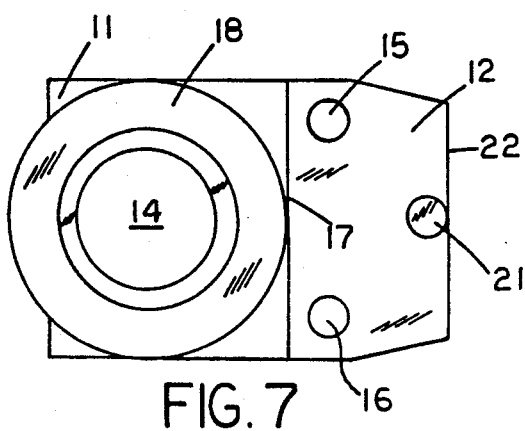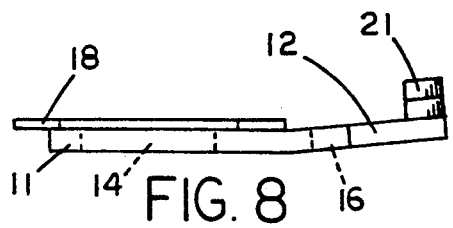

STEERING LINKAGE GREASE CUP RETAINER APPARATUS

BACKGROUND OF THE INVENTION

1. Field of the Invention

The field of invention relates to linkage for vehicles, and more particularly pertains to a new and improved steering linkage grease cup retainer apparatus to provide for the retention of a joint and associated grease retainer cup relative to a steering linkage member.

2. Description of the Prior Art

In vehicles utilizing pivotally mounted steering linkage components, the joints joining the components together include flexible grease cup retainer members to maintain grease relative to the joint structure. Frequently upon rupture of the associated flexible grease cup, the joint is quickly eroded permitting rapid erosion of the joint as well as the steering link member. The instant invention attempts to overcome deficiencies of the prior art by providing for structure to effect replacement of the grease cup member in association with a joint.

The prior art has failed to adequately address the replacement of such grease cup structure and in such patents as U.S. Pat. Nos. 4,926,756 to Smith; 4,471,922 to Fairclough; 4,327,926 to Suganuma; and 4,784,512 to Warner setting forth examples of steering linkages utilized in conventional vehicular environments.

As such, it may be appreciated that there continues to be a need for a new and improved steering linkage grease cup retainer apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of vehicular repair apparatus now present in the prior art, the present invention provides a steering linkage grease cup retainer apparatus wherein the same is arranged to effect securement of a grease cup relative to a steering linkage joint. As such, the general purpose of the present invention, which will be described subsequently in greater detail, is to provide a new and improved steering linkage grease cup retainer apparatus which has all the advantages of the prior art steering linkage apparatus and none of the disadvantages.

To attain this, the present invention provides a structure for replacement of a grease cup relative to a steering linkage and an associated joint thereof. Should a steering link and its associated joint loose the cup fitting, use of a grease cup and mounting of the joint therewithin is lost to effect rapid erosion of the joint, wherein the structure provides for an angulated plate member containing a replacement cup secured to the steering link at the joint to retain the joint and replacement cup to the steering link.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved steering linkage grease cup retainer apparatus which has all the advantages of the prior art steering linkage apparatus and none of the disadvantages.

It is another object of the present invention to provide a new and improved steering linkage grease cup retainer apparatus which may be easily and efficiently manufactured and marketed.

It is a further object of the present invention to provide a new and improved steering linkage grease cup retainer apparatus which is of a durable and reliable construction.

An even further object of the present invention is to provide a new and improved steering linkage grease cup retainer apparatus which is susceptible of a low cost of manufacture with regard to both materials and labor, and which accordingly is then susceptible of low prices of sale to the consuming public, thereby making such steering linkage grease cup retainer apparatus economically available to the buying public.

Still yet another object of the present invention is to provide a new and improved steerage linkage grease cup retainer apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of a first clamp ring utilized by the invention.

FIG. 2 is an orthographic end view of the clamp ring, as set forth in FIG. 1.

FIG. 3 is an orthographic top view of a second size clamp ring utilized by the invention.

FIG. 4 is an orthographic end view of the ring as set forth in FIG. 3.

FIG. 5 is an orthographic top view of the clamping plate structure of the invention.

FIG. 6 is an orthographic end view of the clamping plate structure.

FIG. 7 is an orthographic top View of the clamping plate in association with the clamp ring.

FIG. 8 is an orthographic end view of the clamp ring and plate structure as set forth in FIG. 7.

DESCRIPTION OF THE PREFERRED EMBODIMENT

Figure 9:
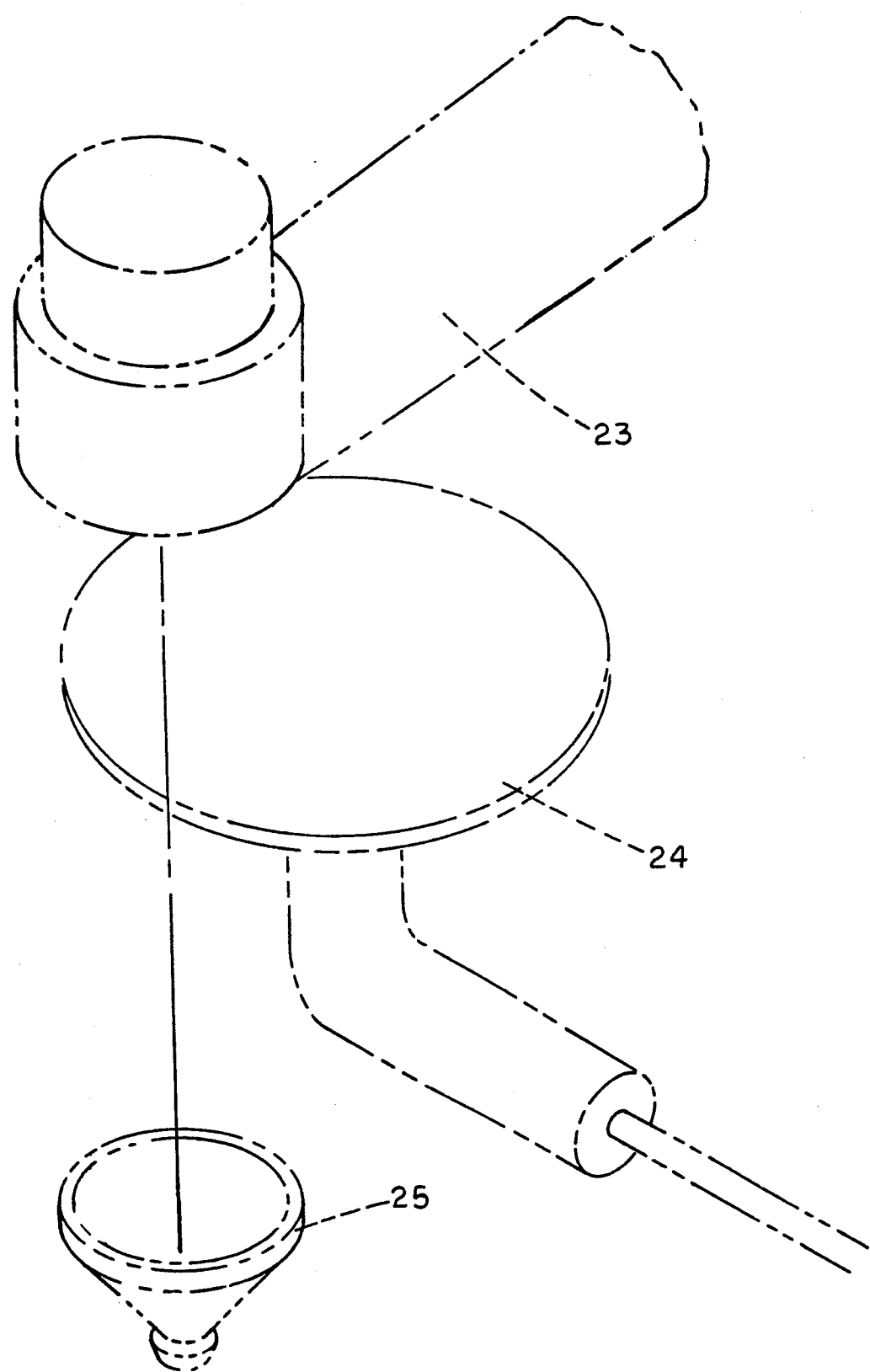
FIG. 9 is an isometric phantom illustration of preparation of a steering linkage joint end utilizing a grinding tool.
Figure 10:
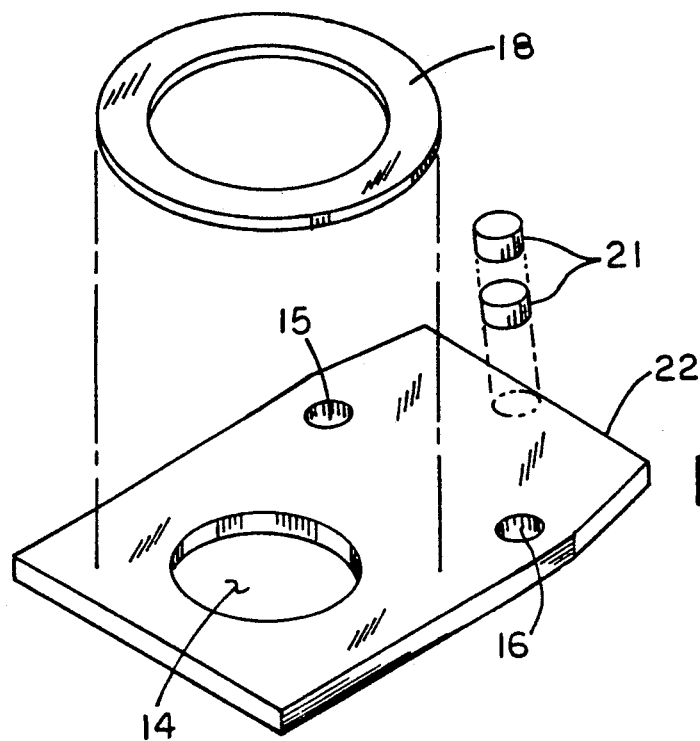
FIG. 10 is an isometric illustration of the invention utilizing the first clamp ring.
Figure 11:
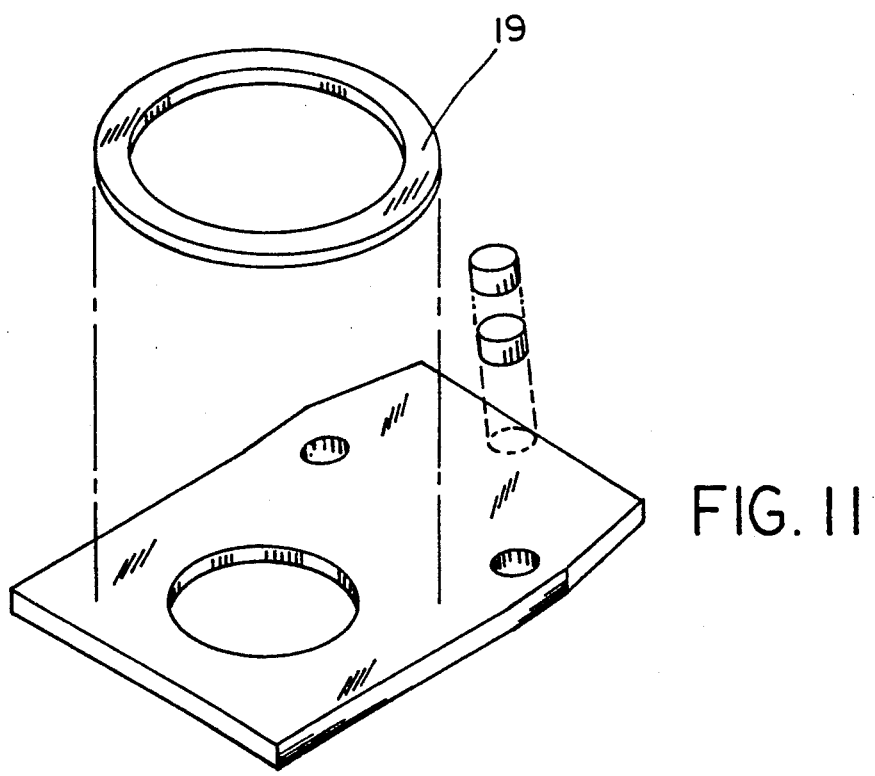
FIG. 11 is an isometric illustration of the invention utilizing the second clamp ring.
Figure 12:
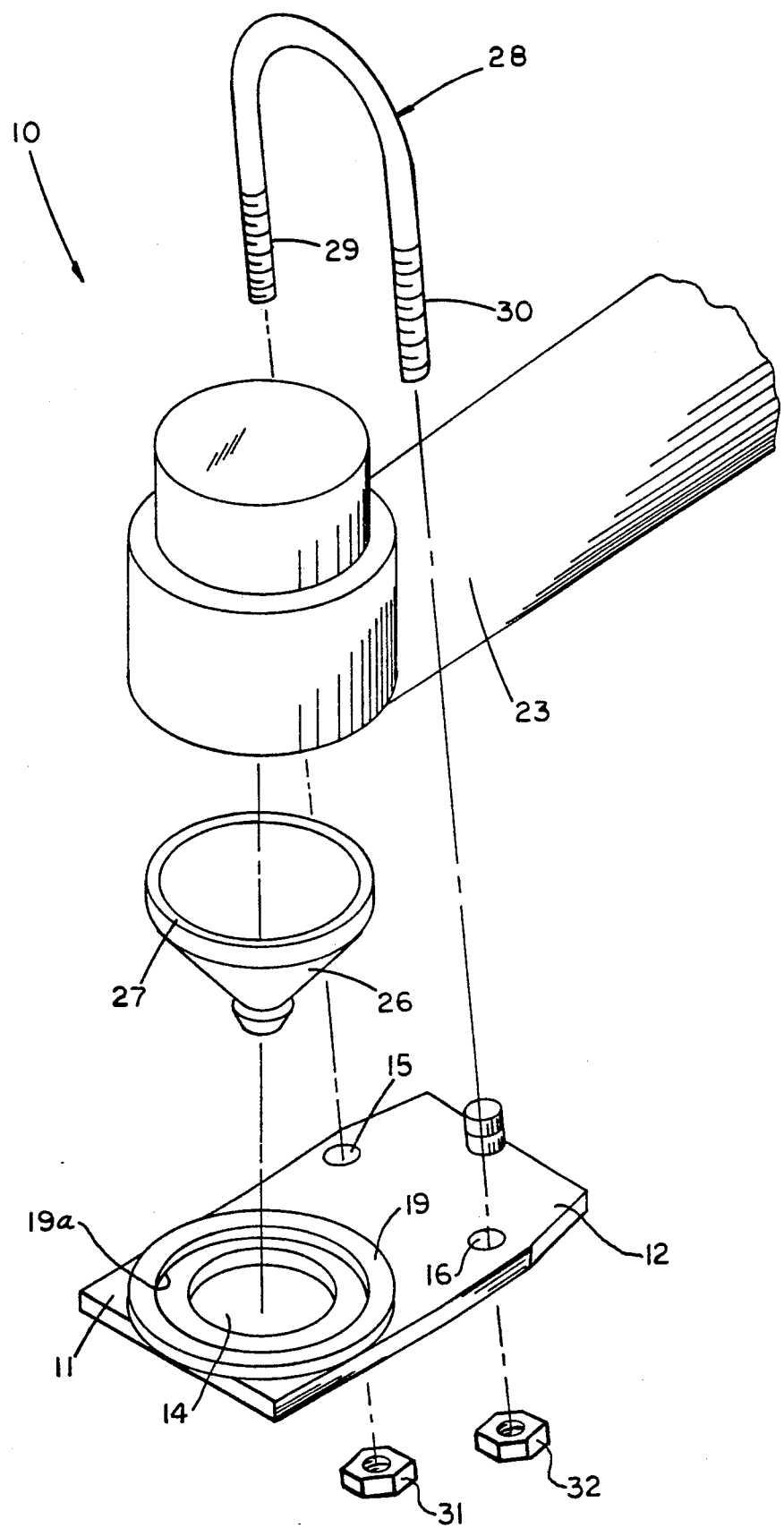
FIG. 12 is an isometric illustration of the invention in exploded illustration illustrating the various components thereof and their inter-relationship.

With reference now to the drawings, and in particular to FIGS. 1 to 12 thereof, a new and improved steering linkage grease cup retainer apparatus embodying the principles and concepts of the present invention and generally designated by the reference numeral 10 will be described.

More specifically, the steering linkage grease cup retainer apparatus 10 of the instant invention essentially comprises a first plate 11 integrally mounted to a second plate 12 at a linear intersection 17 at an obtuse included angle 13 therebetween. The first plate 11 is defined by a first plate first side spaced from a first plate second side, and the second plate includes a second plate first side coextensive with the first plate first side and a second plate second side spaced from the second plate first side, with the second plate second side coextensive with the first plate second side. A first plate bore 14 of a first diameter is directed through the first plate, and wherein the second plate includes a second plate first bore and a second plate second bore 15 and 16 respectively. The second plate first and second bores are spaced an equal distance from the linear intersection 17 and are positioned adjacent the respective second plate first and second sides 12a and 12b respectively. A first clamp ring 18 and a second clamp ring 19 are provided of respective first ring bores 18a and second ring bores 19a, each bore greater than the first diameter, with each bore of a varying diameter such as the bore 19a greater than the bore 18a to accommodate grease cup members 26 of varying sizes relative to the steering linkage 23, such as illustrated in the FIG. 12.

A plurality of spacer lugs 21 are available and are optionally utilized to provide proper orientation of the first and second plates 11 and 12 relative to the steering linkage 23, with the spacer lugs 21 positioned adjacent the second plate rear edge 22 that in turn is spaced from the linear intersection 17.

FIG. 9 illustrates available preparation of the joint as required, wherein a grinder tool 24 is provided to provide for grinding of an appropriate mating surface of the joint to accommodate a replacement cup 26 for the discarded grease cup 25. A replacement grease cup 26 is of flexible construction utilizing an annular lip 27 that is arranged to be captured within the clamp ring 19, as illustrated, as the clamp ring 19 is positioned concentrically about the first plate bore 14 to thereby capture the annular flange 27 between the second clamp ring 19 and the steering linkage member of the steering linkage 23. A U shaped fastener rod 28 is directed over the steering linkage adjacent the end joint, with the fastener rod 28 to include a fastener rod first externally threaded leg spaced from and parallel a fastener rod second externally threaded leg. Respective first and second legs 29 and 30 are received through the respective second plate first and second bores 15 and 16. Subsequently, a respective first and second fastener 31 and 32 are threadedly secured to the first and second legs 29 and 30 to clamp the first and second plates and the associated replacement cup in contiguous communication with the joint portion of the steering linkage to coaxially align the replacement grease cup 25 and the associated first plate bore 14 relative to the end joint in an assembled configuration to finally provide the replacement grease cup in secured relationship relative to the end joint of the steering linkage member 23.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A steering linkage grease cup retainer apparatus for securement to a steering linkage, wherein the steering linkage includes a joint end, the joint end is mounted to a linkage distal end of the steering linkage, wherein the apparatus comprises, a first plate integrally mounted to a second plate at a linear intersection, with the first plate and second plate defining an obtuse included angle therebetween and the first plate including a first plate first side spaced from a first plate second side, and the second plate including a second plate first side coextensive with the first plate first side spaced from a second plate second side coextensive with the first plate second side, and the first plate including a first plate bore defined by a first diameter oriented substantially medially of the first plate spaced from the linear intersection, and the second plate including a second plate first bore and a second plate second bore spaced an equal distance on opposed sides of the first plate bore and positioned adjacent the linear intersection, with the second plate first bore positioned adjacent the second plate first side and the second plate second bore positioned adjacent the second plate second side, and a replacement flexible grease cup member, including an annular flange, the grease cup positioned concentrically through the first plate bore, with the annular flange positioned in surrounding relationship relative to the first plate bore, and clamp means for securement of the first plate and the second plate to the steering link.

2. An apparatus as set forth in claim 1 including a clamp ring mounted in surrounding relationship relative to the annular flange and positioned on a top surface of the first plate adjacent the linear intersection to retain the annular flange within the clamp ring when the clamp ring secures the first plate and the second plate to the steering link.

3. An apparatus as set forth in claim 2 wherein the second plate includes a second plate rear edge, the second plate rear edge is spaced from the linear intersection, and at least one spacer lug positioned on the second plate adjacent the second plate rear edge for abutment with the steering link.

4. An apparatus as set forth in claim 3 wherein the clamp means includes a U shaped fastener rod, the U shaped fastener rod including first externally threaded leg spaced from and parallel a second externally threaded leg, the U shaped fastener is arranged for positioning in surrounding relationship relative to the steering link, with the first externally threaded leg directed through the second plate first bore and the second externally threaded leg directed through the second plate second bore, and a first fastener secured to the first externally threaded leg to a bottom surface of the second plate, and a second fastener secured to the second externally threaded leg to the bottom surface of the second plate.

* * * * *